United States Patent
Lundbladh et al.

(10) Patent No.: US 8,215,096 B2
(45) Date of Patent: Jul. 10, 2012

(54) OUTLET DEVICE FOR A JET ENGINE AND A CRAFT COMPRISING SUCH AN OUTLET DEVICE

(75) Inventors: Anders Lundbladh, Trollhätan (SE); Melker Härefors, Trollhättan (SE); Richard Avellán, Göteborg (SE)

(73) Assignee: Volvo Aero Corporation, Trollhatlan (SE)

( * ) Notice: Subject to any disclaimer, the term of this patent is extended or adjusted under 35 U.S.C. 154(b) by 892 days.

(21) Appl. No.: 11/718,728

(22) PCT Filed: Oct. 20, 2005

(86) PCT No.: PCT/SE2005/001573
§ 371 (c)(1), (2), (4) Date: Nov. 21, 2008

(87) PCT Pub. No.: WO2006/049552
PCT Pub. Date: May 11, 2006

(65) Prior Publication Data
US 2009/0211224 A1  Aug. 27, 2009

(30) Foreign Application Priority Data
Nov. 5, 2004  (SE) ...................................... 0402717

(51) Int. Cl.
*F02K 1/00* (2006.01)
(52) U.S. Cl. .......... 60/229; 239/265.27; 60/228; 60/770
(58) Field of Classification Search .................. 60/39.5, 60/228–230, 770, 771; 239/265.11, 265.19, 239/265.27, 265.29; 244/12.5, 23 D, 52
See application file for complete search history.

(56) References Cited

U.S. PATENT DOCUMENTS

| 2,857,740 | A | | 10/1958 | Hall et al. |
| 2,865,169 | A | | 12/1958 | Hausmann |
| 3,016,063 | A | * | 1/1962 | Hausmann ................... 137/830 |
| 3,025,667 | A | | 3/1962 | Moorehead |
| 3,154,917 | A | * | 11/1964 | Williamson .................... 415/50 |
| 3,578,009 | A | * | 5/1971 | Spyropoulos ................ 137/832 |
| 3,581,995 | A | * | 6/1971 | Fischer .................... 239/265.19 |
| 4,050,631 | A | | 9/1977 | Syltebo |
| 4,099,671 | A | * | 7/1978 | Leibach ................... 239/265.29 |
| 5,092,524 | A | * | 3/1992 | Garrett et al. ............ 239/265.19 |
| 5,170,964 | A | * | 12/1992 | Enderle et al. .................. 244/52 |
| 5,294,055 | A | * | 3/1994 | Garrett et al. ............ 239/265.19 |
| 2003/0001046 | A1 | | 1/2003 | Carpenter |

FOREIGN PATENT DOCUMENTS

GB  744196 A  2/1956
GB  844179 A  8/1960

OTHER PUBLICATIONS

Supplementary European Search Report from corrsponding European App. EP 05 79 4646.
International Search Report from corresponding International Application PCT/SE2005/001573.

* cited by examiner

*Primary Examiner* — William H Rodriguez
*Assistant Examiner* — Phutthiwat Wongwian
(74) *Attorney, Agent, or Firm* — WRB-IP LLP

(57) ABSTRACT

An outlet device for a jet engine comprises a number of fixed ducts, each with a gas intake and a gas outlet for conducting a gas from the jet engine, at least two of the outlets of said gas ducts open in different directions, and a gas distribution arrangement is arranged at the gas intakes for selective distribution of the gas to the ducts.

17 Claims, 7 Drawing Sheets

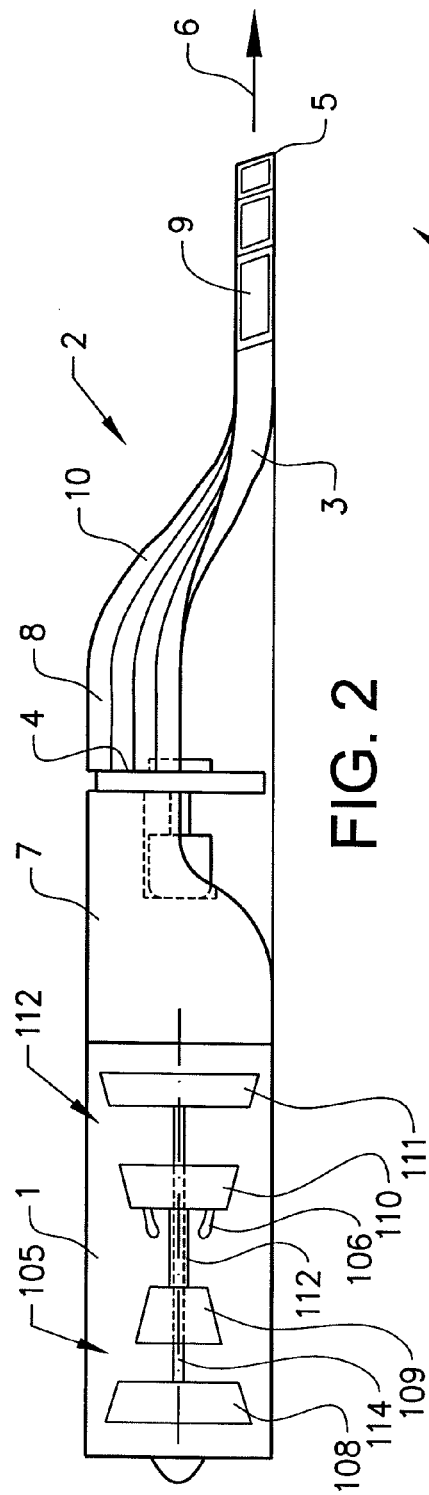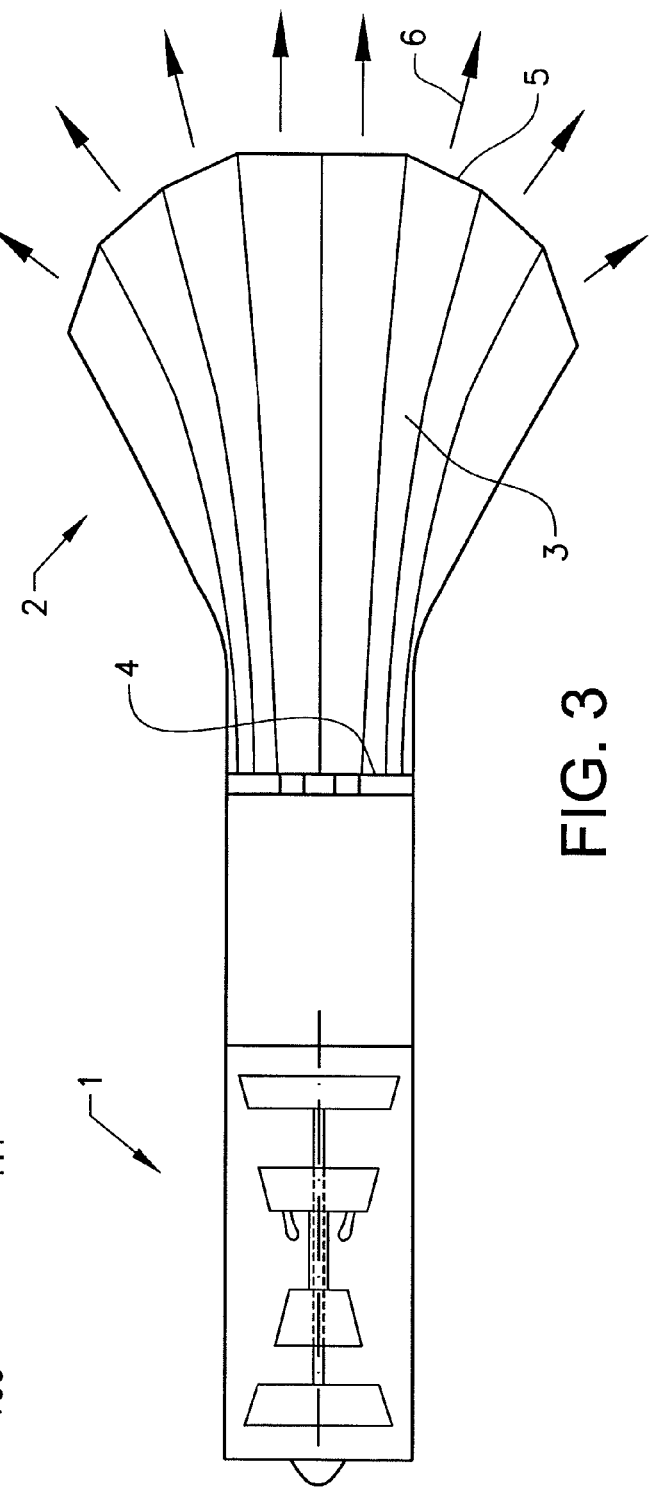

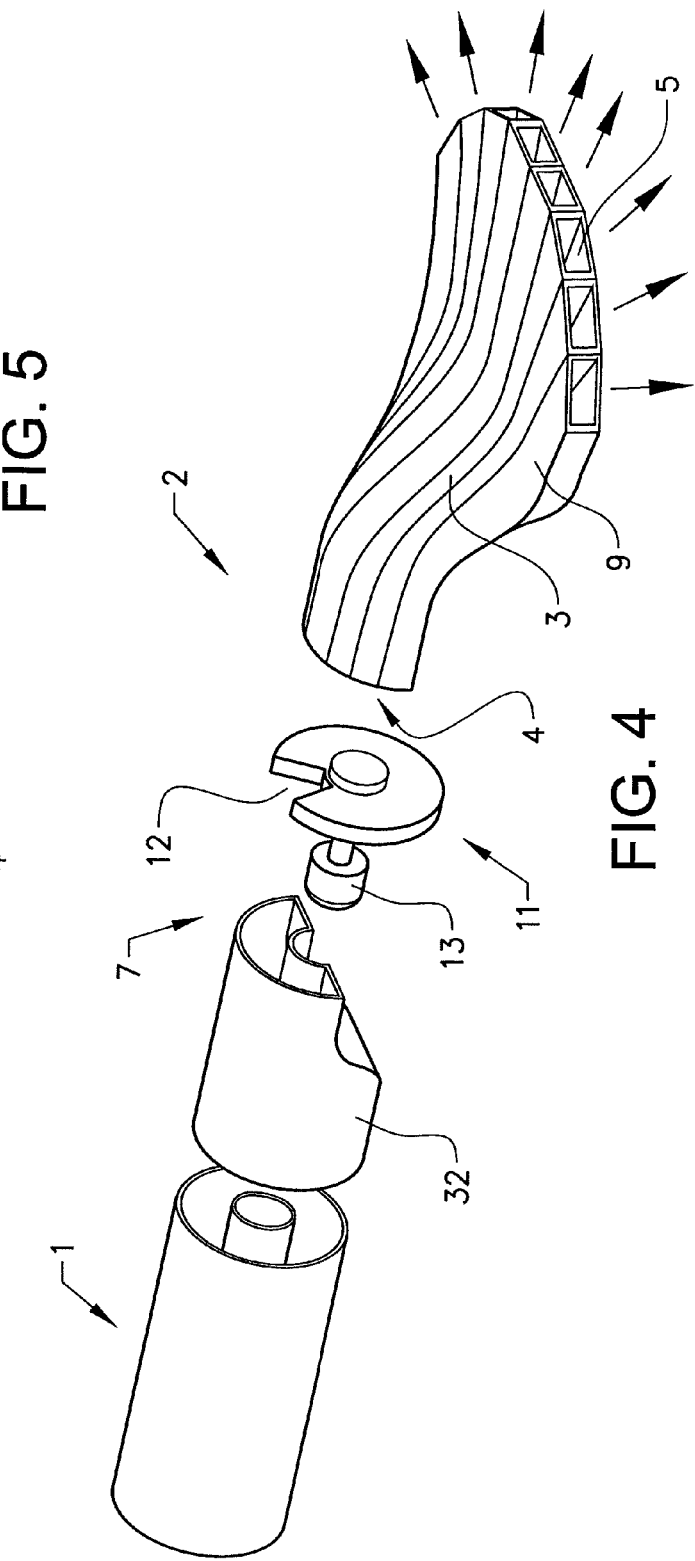

OUTLET DEVICE FOR A JET ENGINE AND A CRAFT COMPRISING SUCH AN OUTLET DEVICE

BACKGROUND AND SUMMARY

The present invention relates to an outlet device for a jet engine and also a jet-propelled craft comprising a jet engine with such an outlet device.

The term jet engine is intended to include various types of engine which take in air at relatively low speed, heat it via combustion and eject it at much higher speed. The term jet engine includes turbojet engines and turbofan engines, for example.

The jet engine conventionally comprises a compressor section for compression of the incoming air, a combustion chamber for combustion of the compressed air and a turbine section arranged after the combustion chamber, which turbine section is rotationally connected to the compressor section in order to drive the latter with the aid of the energy-rich gas from the combustion chamber. The compressor section usually comprises a low-pressure compressor and a high-pressure compressor. The turbine section usually comprises a low-pressure turbine and a high-pressure turbine. The high-pressure compressor is connected in a rotationally fixed manner to the high-pressure turbine via a first shaft, and the low-pressure compressor is connected in a rotationally fixed manner to the low-pressure turbine via a second shaft.

The jet engine can be used for propulsion of various types of jet-propelled craft including both landcraft and watercraft, but the invention is primarily intended to be applied in an aircraft, and then in particular in an aircraft engine. It is previously known to protect an aircraft against possible attack by providing the aircraft with a low signature. In this context, signature means contrast against the background. For example, hot structures and hot exhaust gases give rise to an IR signature.

It is also known that a tail fin on the craft gives rise to a strong radar signature. It would therefore be desirable to bring about steering of a craft in a different way.

It is desirable to produce an outlet device for a jet engine which will provide the craft propelled by the jet engine with alternative steering. Also aimed at is an outlet device for a jet engine which affords opportunities for providing the jet engine and/or the craft propelled by the jet engine with a signature reduction.

According to an aspect of the present invention, an outlet device comprises a number of fixed ducts, each with a gas intake and a gas outlet for conducting a gas from the jet engine. At least two of the outlets of said gas ducts open in different directions. Furthermore, a gas distribution arrangement is arranged at said gas intakes for selective distribution of the gas to said ducts.

By controlling the gas distribution arrangement in a suitable way, it is possible to vector the thrust from the engine and thus to increase the maneuverability of the craft, and the possibilities for flying the craft stably are thus improved.

BRIEF DESCRIPTION OF THE FIGURES

The invention is to be described in greater detail below with reference to the embodiments shown in the accompanying drawing, in which

FIG. 2 shows diagrammatically a side view of the outlet device according to the first embodiment;

FIG. 3 shows a view from above of the outlet device according to the first embodiment;

FIG. 4 shows a diagrammatic exploded view of the outlet device according to the first embodiment;

FIG. 5 shows a duct configuration in a perspective view of the outlet device according to the first embodiment;

DETAILED DESCRIPTION

Figure 1:
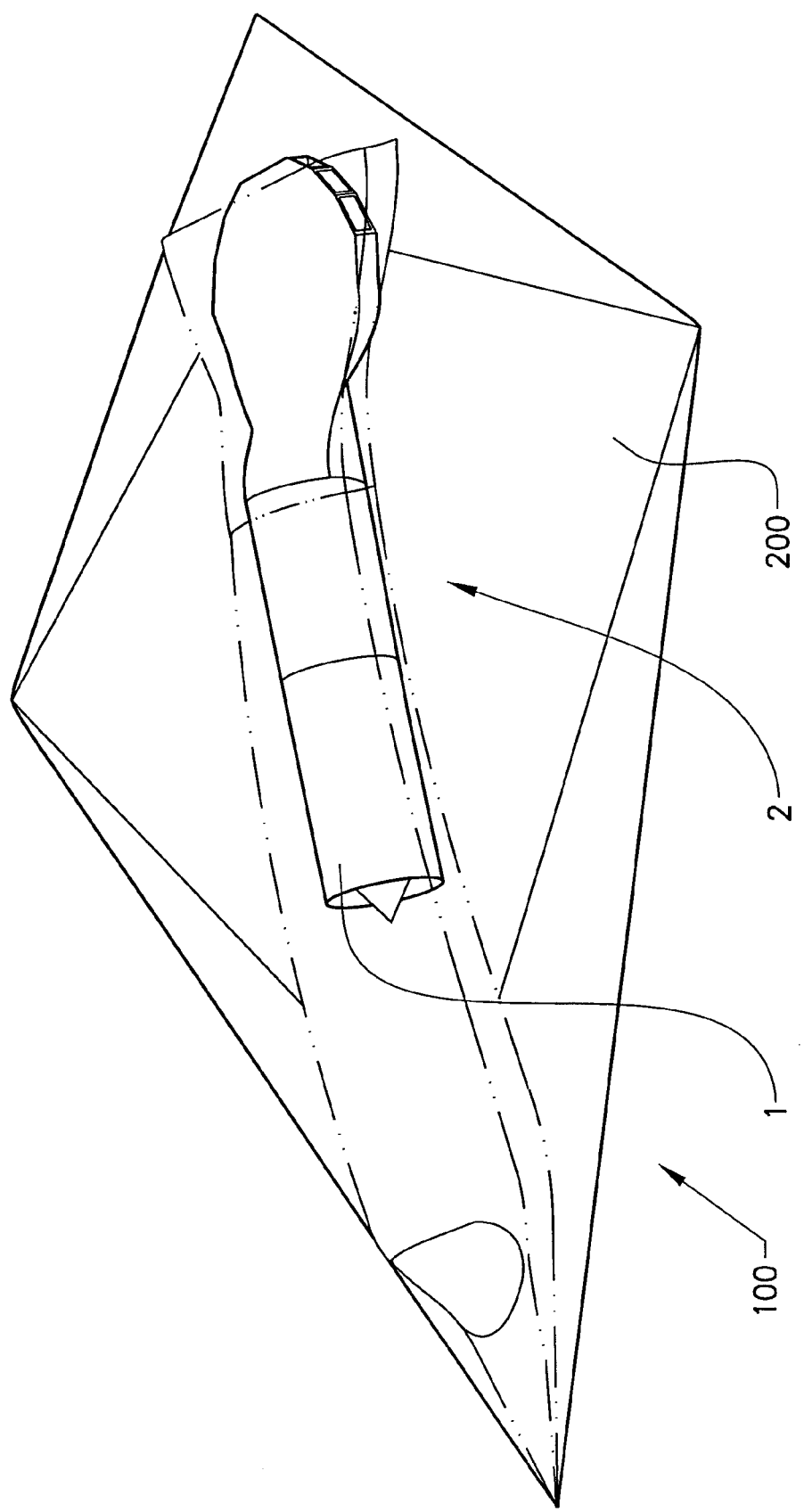
FIG. 1 shows a perspective view of an aircraft comprising a jet engine and an outlet device according to a first embodiment.

FIG. 1 shows a perspective view of an aircraft 100 of the stealth type without tail fin. A jet engine 1 with an outlet device 2 according to a first preferred embodiment is positioned centrally in the aircraft body. A wing 200 projects in the lateral direction of the aircraft on both sides of the aircraft body. FIG. 2 shows diagrammatically the jet engine 1 and the outlet device 2 which is connected to the outlet of the engine 1.

The jet engine 1 comprises a compressor section 105 for compression of the incoming air, a combustion chamber 106 for combustion of the compressed air and a turbine section 112 arranged after the combustion chamber, which turbine section is rotationally connected to the compressor section in order to drive the latter with the aid of the energy-rich gas from the combustion chamber.

The compressor section 105 comprises a low-pressure part 108, or fan, and a high-pressure part 109. The turbine section 112 comprises a low-pressure part 111 and a high-pressure part 110. The high-pressure compressor 110 is connected in a rotationally fixed manner to the high-pressure turbine 109 via a first shaft 112, and the low-pressure compressor 108 is connected in a rotationally fixed manner to the low-pressure turbine 111 via a second shaft 114. In this way, a high-pressure rotor and a low-pressure rotor are formed. These are mounted concentrically and rotate freely in relation to one another.

FIGS. 2-5 show different views of the outlet device 2 according to the first embodiment. The outlet device 2 comprises a number of fixed ducts 3, each with a gas intake 4 and a gas outlet 5 for conducting a gas from the jet engine 1. More specifically, the outlet device 2 comprises a fixed wall structure, the walls of which define the gas ducts 3. At least two of the outlets of said gas ducts open in different directions, that is to say have different vector angles. The direction of the gas which flows out from the outlets 5 of the gas ducts 3 is illustrated by the arrows 6. The gas ducts 3 are arranged adjacent to one another, and their outlets 5 open in a diverging configuration. It can be seen from FIG. 2 that the gas ducts 3 have such a shape that each gas intake 4 is at least essentially concealed seen in the axial direction of the jet engine 1 from its outlet side 5. For this purpose, the gas ducts 3 have at least partially an extension direction with a component different from the axial direction of the engine. In this way, hot engine parts, such as the turbine parts 110, 111, located inside the gas intakes 4 of the outlet device 2 are concealed from view from the rear. The IR signature is thus reduced considerably.

More specifically, both an inlet portion 8 and an outlet portion 9 of each gas duct 3 have an essentially axial extension direction, and a portion 10 between the inlet portion 8 and the outlet portion 9 has an extension direction with a component different from the axial direction of the engine. The extension direction of the intermediate portion 10 is therefore angled relative to the axial direction of the engine. The gas duct structure can thus be said to have an extended S or Z shape seen from the side. The outlet portions 9 of the gas ducts 3 extend at least in the main in the same plane. The gas 6 thus flows out from the gas ducts in a plane parallel to the axial direction of the engine.

The outlet device 2 comprises a gas distribution arrangement 7 arranged at said gas intakes 4 for selective distribution of the gas to said ducts 3.

Each of the gas ducts 3 has a greater extent transverse to its longitudinal direction at its outlet 5 than at its inlet 4 (see FIGS. 4 and 5). The gas ducts 3 are arranged in such a way that the direction of greater extent coincides for at least a number of and preferably all the ducts. Here, each of the gas ducts 3 has an essentially rectangular cross-sectional shape at its outlet 5. The outlet portions 9 of the gas ducts 3 extend at least in the main in the same plane, which is parallel to the axial direction of the engine. A long side of the rectangular shape of the gas ducts 3 is parallel to this plane.

The longer side of the rectangular gas duct part 3 is considerably longer than a shorter side of the rectangular gas duct part. The outlet configuration formed by the gas ducts 3 is therefore "flattened" with a large width/height ratio. By virtue of this, rapid mixing of the hot gas with the cold surrounding air is achieved.

The gas duct intakes 4 are positioned next to one another and together define a peripheral direction transverse to the longitudinal direction of the ducts. The gas duct intakes 4 together define a curved and in this case part-circular shape.

The gas distribution arrangement 7 comprises a stationary, tubular cylinder 32 for gas flowthrough. The cylinder 32 is connected to the engine 1 and has a shape which converges toward the gas duct intakes 4. That end of the cylinder 32 facing the engine 1 has a circular shape corresponding to the shape of the engine outlet. That end of the cylinder 32 facing the gas intake 4 has a part-circular shape corresponding to the extension of the gas intakes 4 in the peripheral direction.

The gas distribution arrangement 7 also comprises a movable distribution element 11 (see FIG. 4) arranged between the stationary cylinder 32 and the gas intake 4. The distribution element 11 can be adjusted into different positions for guiding the gas flow from the jet engine (and the cylinder 32) to one or more gas duct intake(s) 4 and simultaneously blocking the other gas duct intakes. The distribution element 11 is arranged rotatably/turnably. Here, the distribution element 11 consists of a rotatable circular disk with an opening 12 for gas flowthrough. The opening 12 extends over only a part of the circumference of the circle and covers a few duct inlets. The gas distribution arrangement 7 comprises means 13, such as an electrohydraulic actuator or an electric motor, for rotation of the circular disk.

Figure 6:
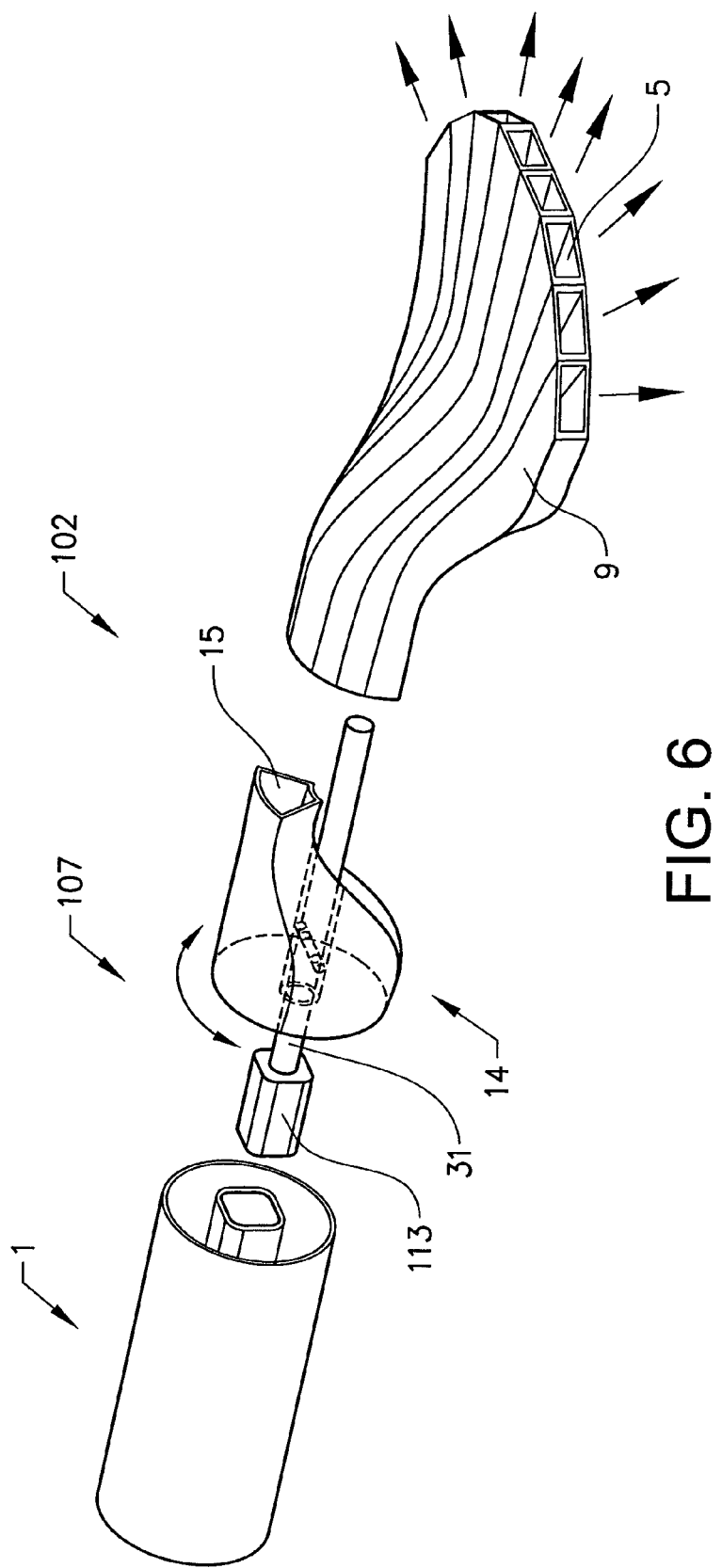
FIG. 6 shows a diagrammatic exploded view of an outlet device according to a second embodiment.

FIG. 6 shows the outlet device 102 according to a second embodiment. Compared with the first embodiment, the design of the distribution element 14 differs. Here, the distribution element 14 consists of a rotatably/turnably arranged convergent tubular cylinder which is connected in a rotationally fixed manner to a shaft 31 parallel to the axial direction of the engine. A front end of the cylinder 14, which faces the gas duct intakes, has an opening 15 for gas flowthrough. The opening 15 extends over only a part of the circumference of the circle and covers a few duct inlets.

A gas distribution arrangement 107 comprises means 113, such as an electrohydraulic actuator or an electric motor, for turning the cylinder 14 in order selectively to bring about redistribution of the gas flow (the exhaust gases from the engine) to one or more of said ducts. The turning element 113 is adapted to turn the shaft 31.

Figure 7:
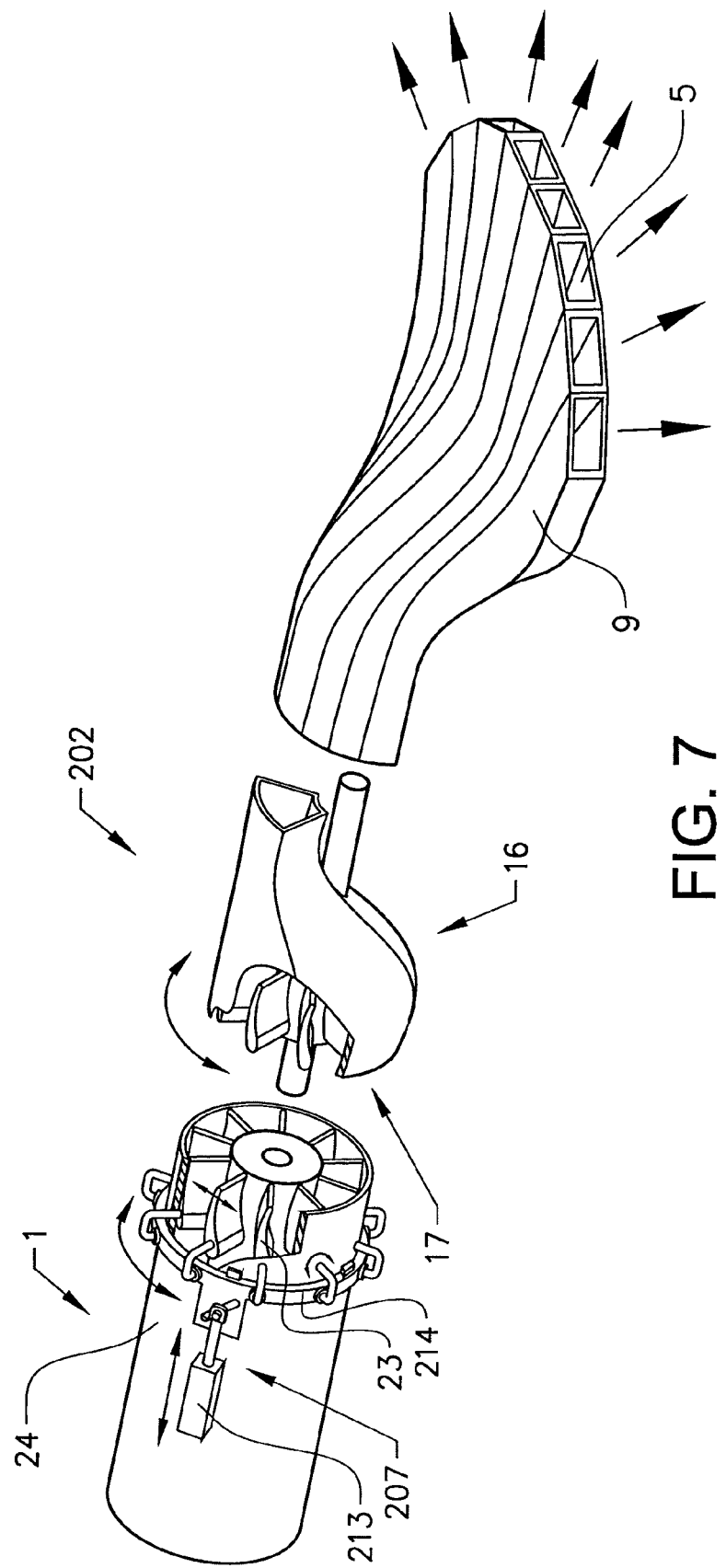
FIG. 7 shows a diagrammatic, partly cut-away exploded view of an outlet device according to a third embodiment.

FIG. 7 shows the outlet device 202 according to a third embodiment. The outlet device 202 comprises a distribution element 16 which is a variant of that shown in FIG. 6. A number of fixed guide vanes 17 are arranged with a spacing in relation to one another in the peripheral direction of the rotatably arranged, convergent tubular cylinder. A number of adjustable guide vanes 23 are arranged with a spacing in relation to one another in the peripheral direction in the rear turbine housing 24 of the jet engine. The adjustable guide vanes 23 are adjusted in such a way that a deflection of the gas flow (the engine exhaust gases) takes place, which creates a torque on the cylinder 16 which rotates the cylinder into the desired position in order to bring about the redistribution of the gas flow. A gas distribution arrangement 207 comprises means 213, such as an electrohydraulic actuator or an electric motor, for rotation of an annular element 214 which extends around the turbine housing 24 and is connected to each of the adjustable guide vanes 23 in order to bring about the redistribution of the gas flow (the exhaust gases from the engine).

Figure 8:
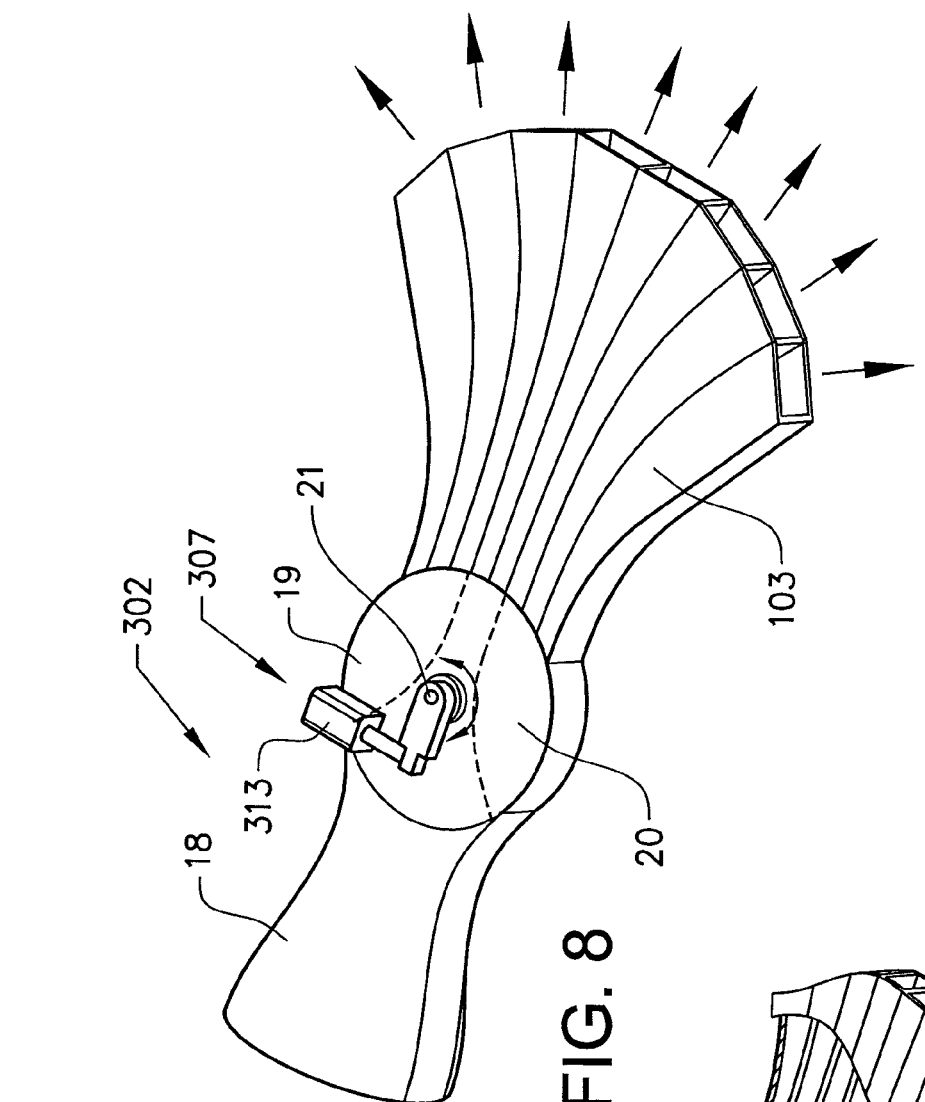
FIG. 8 shows a diagrammatic perspective view of an outlet device according to a fourth embodiment.
Figure 9:
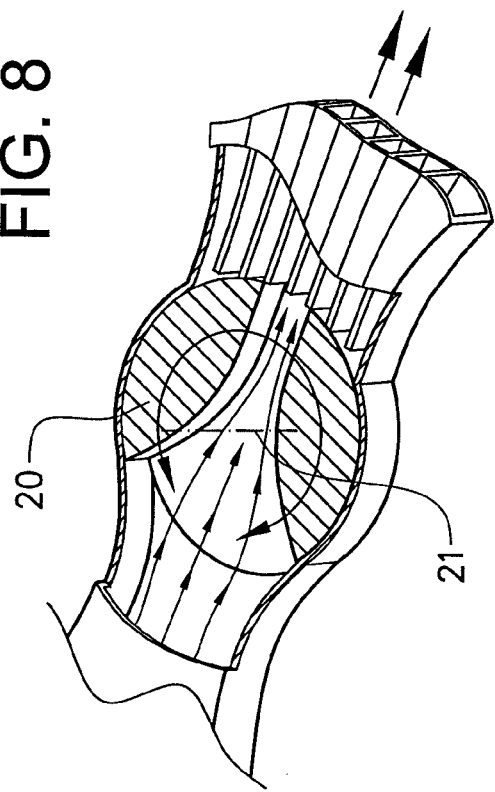
FIG. 9 shows a cut-away perspective view of an adjusting mechanism in the outlet device according to the fourth embodiment.

FIGS. 8 and 9 show an outlet device 302 according to a fourth embodiment. Here, the gas ducts 103 extend in the main in a plane along their entire length. A central duct has an essentially linear extension, while adjacent ducts have a shape which is curved outward increasingly with increasing distance from the central duct.

The gas duct inlets which lie next to one another therefore define an essentially straight line transverse to their extension direction. An intermediate portion 18 which connects the duct structure to the engine 1 comprises a relatively flat section 19 which extends parallel to the plane of the ducts 103.

The outlet device 302 comprises a distribution element 20 which consists of a rotatably/turnably arranged, relatively flat cylinder located in the flattened section 19. The cylinder 20 therefore has a relatively low height and is arranged rotatably/turnably about a vertical axis 21. The axis 21 therefore extends at right angles to the axial direction of the engine. The horizontal cylinder 20 has an opening for gas flowthrough which faces the duct inlets. The opening extends over only a part of the combined length of the gas duct inlets in the lateral direction and therefore covers only a few duct inlets. That side of the horizontal cylinder 20 which faces the engine 1 is open.

A gas distribution arrangement 307 comprises means 313, such as an electrohydraulic actuator or an electric motor, for rotation of the rotatably arranged, flat cylinder 20 in order selectively to bring about the redistribution of the gas flow (the exhaust gases from the engine) to one or more of said ducts.

Figure 10:
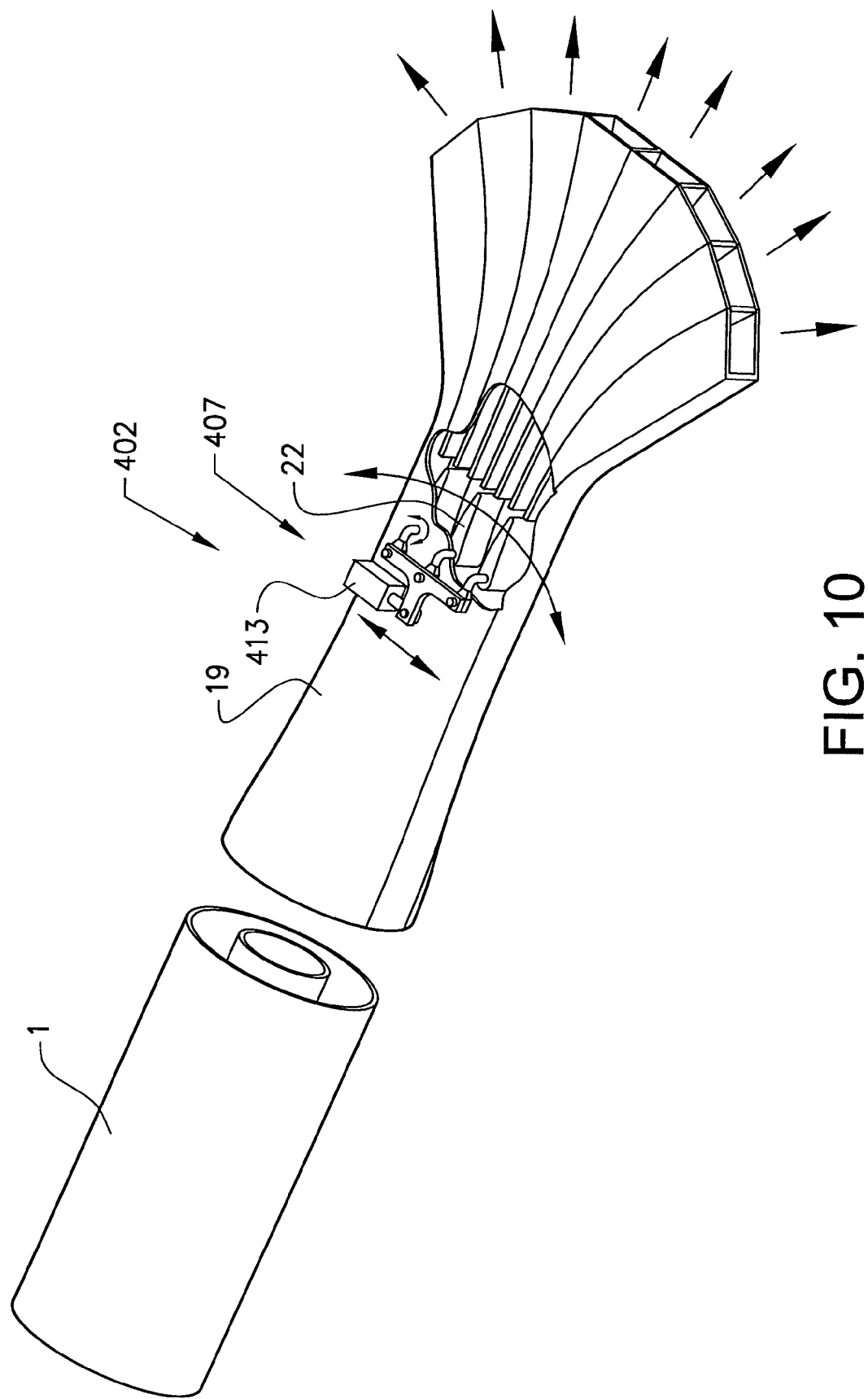
FIG. 10 shows a diagrammatic, partly cut-away exploded view of an outlet device according to a fifth embodiment.

FIG. 10 shows an outlet device 402 according to a fourth embodiment. Compared with the embodiment shown in FIGS. 8 and 9, the gas distribution arrangement 407 differs. The gas distribution arrangement 407 comprises a number of turnable distribution elements 22 of blade shape, or guide vanes, which are located in the flattened section 19. The blade-shaped distribution elements 22 are arranged parallel to one another and can be adjusted into different positions for guiding the gas flow between them to one or more gas duct intake(s) and blocking the other gas duct intakes.

The gas distribution arrangement 407 comprises means 413, such as an electrohydraulic actuator or an electric motor, connected to the distribution elements 22 for simultaneous turning of these for the purpose of selectively bringing about the redistribution of the gas flow (the exhaust gases from the engine) to one or more of said ducts.

According to a first embodiment, the jet engine 1 is of double-flow type, which means that an incoming air flow is divided into two flows after it has passed through the fan 108, an inner, the compressor air flow, and an outer, the fan air flow. The jet engine 1 therefore comprises a radially inner main duct for a primary flow to the combustion chamber 106 and a radially outer duct for secondary flow (bypass for fan flow). The gas ducts are concentric and annular. The inner gas flow emerging from the jet engine 1 is called the core flow below.

The functioning of the outlet device is described briefly below. Core air and fan air are mixed in a mixer arranged between the engine and the gas distribution arrangement. The gas distribution arrangement according to any one of the alternatives described above then distributes the air flow to selected outlet ducts. When flying without vectoring, the air is guided to the ducts in the center. When flying with vectoring, the flow is guided continuously over to ducts on the right/left side. Vectored thrust is achieved on the one hand by virtue of the air flow changing direction and on the other hand by virtue of the thrust being moved in the lateral direction from the center line (the axial direction of the engine).

The devices preferably comprise sensors which measure the turning angle of the distribution mechanisms.

The invention is not to be regarded as being limited to the illustrative embodiments described above, but a number of further variants and modifications are conceivable within the scope of the patent claims below.

In the description above, the outlets of the gas ducts have a diverging configuration. However, it lies within the scope of the invention for the gas ducts to open in a parallel fashion or even convergently.

The invention can of course be used for other types of aircraft than that shown in FIG. 1. The jet engine of the aircraft can be mounted under the wing of the aircraft, for example.

The term "jet engine" used above is intended to include various types of engine which take in air at relatively low speed, heat it via combustion and eject it at much higher speed. The term jet engine includes turbojet engines and turbofan engines, for example.

According to an alternative to the embodiment shown in FIG. 2, use is made of a jet engine of single-flow type, the flow emerging from the jet engine being formed by the core flow alone.

The invention claimed is:

1. An outlet device for a jet engine, comprising:
   a plurality of fixed gas duct, each with a respective gas intake and a respective gas outlet for conducting a gas from the jet engine, at least two of the gas outlets of the gas ducts opening in different directions; and
   a gas distribution arrangement having an inlet that receives the gas from the jet engine and an outlet that couples to the gas intakes of the ducts for selective distribution of the gas to the ducts,
   wherein at least one gas duct of the plurality of gas ducts is shaped so that its respective gas intake is substantially entirely concealed when the at least one gas duct is viewed in a direction from its respective gas outlet toward its respective gas inlet.

2. The outlet device as claimed in claim 1, wherein the gas ducts are arranged adjacent to one another.

3. The outlet device as claimed in claim 1, wherein the gas outlets of the gas ducts open in a diverging configuration.

4. The outlet device as claimed in claim 1, wherein outlet portions of the gas ducts extend substantially in the same plane.

5. The outlet device as claimed in claim 1, wherein at least some of the gas ducts each have a greater extent transverse to a longitudinal direction of the at least some of the gas ducts at outlets than at inlets of the at least some of the gas ducts.

6. The outlet device as claimed in claim 1, wherein each of the gas ducts has an essentially rectangular cross-sectional shape at its gas outlet.

7. The outlet device as claimed in claim 1, wherein the outlet device comprises a fixed wall structure, walls of the fixed wall structure defining the gas ducts.

8. The outlet device as claimed in claim 1, wherein the gas distribution arrangement comprises a movable distribution element and the distribution element can be adjusted into different positions for guiding the gas flow to at least one gas duct intake and blocking other ones of the gas duct intakes.

9. The outlet device as claimed in claim 8, wherein the distribution element is arranged rotatably.

10. The outlet device as claimed in claim 9, wherein the distribution element is arranged rotatably about an axis at right angles to an axial direction of the outlet device.

11. The outlet device as claimed in claim 1, wherein the gas distribution arrangement comprises a plurality of movable distribution elements of blade shape and the blade-shaped distribution elements are arranged parallel to one another and can be adjusted into different positions for guiding the gas flow between them to at least one gas duct intake and blocking other ones of the gas duct intakes.

12. A jet-propelled craft, comprising an outlet device as claimed in claim 1.

13. The outlet device as claimed in claim 1, wherein the at least one gas duct of the plurality of gas ducts is shaped so that its respective gas intake is substantially entirely permanently concealed when the at least one gas duct is viewed in the direction from its respective gas outlet toward its respective gas inlet.

14. An outlet device for a jet engine, comprising:
   a plurality of fixed gas ducts; each with a gas intake and a gas outlet for conducting a gas from the jet engine, at least two of the gas outlets of the gas ducts opening in different directions; and
   a gas distribution arrangement having an inlet that receives the gas from the jet engine and an outlet that couples to the gas intakes of the gas ducts for selective distribution of the gas to the gas ducts,
   wherein at least some of the gas ducts each have a greater extent transverse to a longitudinal direction of the at least some of the gas ducts at outlets than at gas inlets of the at least some of the gas ducts, and the at least some of the gas ducts are arranged so that a direction of the greater extent coincides for at least two of the at least some of the gas ducts.

15. An outlet device for a jet engine, comprising:
   a plurality of fixed gas ducts, each with a gas intake and a gas outlet for conducting a gas from the jet engine, at least two of the gas outlets of the gas ducts opening in different directions; and
   a gas distribution arrangement arranged at the gas intakes of the gas ducts for selective distribution of the gas to the gas ducts,
   wherein the gas distribution arrangement comprises a movable distribution element and the distribution element can be adjusted into different positions for guiding the gas flow to at least one gas duct intake and blocking other ones of the gas duct intakes, and the gas duct intakes are positioned next to one another and together define a direction transverse to a longitudinal direction of the gas ducts and the distribution element comprises an opening for gas flowthrough, the opening having a smaller extent in a direction parallel to a transverse direction of the gas duct intakes than the gas duct intakes together have.

16. An outlet device for a jet engine, comprising:

a plurality of fixed gas ducts, each with a gas intake and a gas outlet for conducting a gas from the jet engine, at least two of the gas outlets of the gas ducts opening in different direction and a gas distribution arrangement arranged at the gas intakes of the gas ducts for selective distribution of the gas to the gas ducts, wherein the gas distribution arrangement comprises a movable distribution element and the distribution element adjustable into different positions for guiding the gas flow to at least one gas duct intake and blocking other ones of the gas duct intakes, and the distribution element is arranged rotatably about an axis parallel to an axial direction of the outlet device.

17. The outlet device as claimed in claim 16, wherein a plurality of adjustable guide vanes are arranged with a spacing in relation to one another in a peripheral direction in a rear turbine housing of the jet engine for rotation of the distribution element under gas force which is brought about by controlling an angle of the turnable guide vanes.

* * * * *